United States Patent
Nonninger et al.

(10) Patent No.: US 6,953,603 B2
(45) Date of Patent: Oct. 11, 2005

(54) FUNCTIONAL CERAMIC LAYERS BASED ON A SUPPORT LAYER PRODUCED WITH CRYSTALLINE NANOPARTICLES

(75) Inventors: Ralph Nonninger, Saarbrucken (DE); Olaf Binkle, Kirkel (DE)

(73) Assignee: ItN Nanovation GmbH, Saabrücken (DE)

( * ) Notice: Subject to any disclaimer, the term of this patent is extended or adjusted under 35 U.S.C. 154(b) by 0 days.

(21) Appl. No.: 10/474,983
(22) PCT Filed: Apr. 19, 2002
(86) PCT No.: PCT/DE02/01453

§ 371 (c)(1),
(2), (4) Date: Oct. 9, 2003

(87) PCT Pub. No.: WO02/086194

PCT Pub. Date: Oct. 31, 2002

(65) Prior Publication Data

US 2004/0115416 A1 Jun. 17, 2004

(30) Foreign Application Priority Data

Apr. 21, 2001 (DE) .......................... 101 19 538

(51) Int. Cl.⁷ .............................. B05D 1/00; B05D 3/02
(52) U.S. Cl. .................... 427/226; 427/243; 427/430.1; 427/240; 427/245; 427/372.2; 427/384; 427/421; 427/435; 427/443.2; 428/701; 428/702; 428/469; 428/304.4; 428/632; 428/688; 428/698; 428/323; 428/325; 428/327
(58) Field of Search .............................. 427/435, 443.2, 427/226, 243, 430.1, 240, 245, 372.2, 384, 421; 428/701, 702, 469, 304.4, 632, 688, 698, 323, 325, 327

(56) References Cited

U.S. PATENT DOCUMENTS

| 4,303,554 A | 12/1981 | Sudo et al. |
| 6,086,948 A | 7/2000 | Roth et al. |
| 2003/0003237 A1 * | 1/2003 | Seabaugh et al. ........... 427/421 |

FOREIGN PATENT DOCUMENTS

| DE | 199 600 91 | 7/2001 |
| JP | 5131149 | 5/1993 |
| JP | 8270639 | 10/1996 |
| WO | WO 9950203 | 10/1999 |

OTHER PUBLICATIONS

Maria Cristina Carotta; Matteo Ferroni; Vincenzo Guidi; and Giuliano Martinelli, Preparation and Characterization of Nanostructured Titania Thick Films, Advanced Materials, 199, 11, No. 11, pp. 943–945. Weinheim, Germany.

\* cited by examiner

*Primary Examiner*—Jennifer Michener
(74) *Attorney, Agent, or Firm*—Walter A. Hackler

(57) ABSTRACT

The invention concerns a method for producing porous ceramic layers on metallic, ceramic, enameled or glass substrates using crystalline nanoparticles of particle sizes of between 3 nm and 100 nm via a wet-chemical process and functionalising of this porous ceramic layer through introducing a second component into the pores of the porous ceramic layer which serves as carrier layer.

The porous ceramic layers can be filled with hydrophobizing, hydrophilizing, dirt-repellent and corrosion-inhibiting substances which remain in the substrate or are supplied later on demand, or with bactericidal substances, aromatics, perfumes or inhalation substances which are delivered to the room air in precise doses.

17 Claims, No Drawings

FUNCTIONAL CERAMIC LAYERS BASED ON A SUPPORT LAYER PRODUCED WITH CRYSTALLINE NANOPARTICLES

The invention relates to a method for producing porous ceramic layers on metallic, ceramic, enameled or glass substrates using crystalline nanoparticles with particle sizes of between 3 nm and 100 nm through a wet-chemical process, and functionalization of this porous ceramic layer by introducing a second component into the pores of this porous ceramic layer.

The improvement of surfaces has been known for a long time. The start of a plurality of innovative developments was the precipitation of noble metals such as silver, gold and copper from a solution onto solid substrates. Since then, the field of application of functional layers seems to be almost infinite. Only a few examples are described below. Transparent conducting layers are used for antistatic and reflex-reduced coatings, transparent electrodes for electrochromic applications to gas sensors and solar cells. Hydrophobic coatings are used to realize low-energy surfaces which e.g. prevent deposit of dirt. Moreover, there are layered systems with special tribological properties, anti-finger print layers, catalytically active layers, corrosion protection layers and much more.

These layers can be applied to the substrates to be improved in a plurality of ways and can be used in numerous fields, wherein gas phase processes such as CVD (chemical vapor deposition), PVD (physical vapor deposition) and sputter processes or chemical methods such as sol-gel coating are dominant. While gas phase and sputter processes usually involve high costs and cannot be used for all geometrical shapes, the disadvantages of sol gel layers are that they can only be applied in a very thin layer (layer thickness of usually about 100 nm) and are not temperature-stable. Due to their hybrid network, sol-gel layers have larger portions of organic components which are destroyed at temperature treatment above 300° C., going hand in hand with an increase in the brittleness of the layer and a likewise increase in the intrinsic tensions with the consequence that the layer becomes detached.

Numerous attempts were made to provide metallic, ceramic, enameled or glass substrates with a ceramic layer in a wet-chemical process. Suspensions or pastes of ceramic particles are initially used which are applied via shaping methods such as e.g. dip coating, spin coating, immersion, flooding, spraying, film casting, screen printing etc. which are known to the person skilled in the art. In a second step, these layers must be solidified on the substrate wherein on the one hand, adhesion to the substrate, and on the other hand connection between the individual ceramic particles must be ensured. To meet these requirements, high temperatures are required since sintering of ceramic particles is possible only through diffusion processes. The sintering temperature thereby primarily represents a material constant which depends only on the particle size of the ceramic material used.

To form ceramic protective layers on metallic, ceramic, enameled or glass substrates, they must be sintered preferably in the vicinity of the theoretical density. This requires temperatures which are in the most favorable case stated in literature approximately 1400° C. for e.g. sub-$\mu$m zirconium oxide or at 1300° C. for e.g. sub-$\mu$m aluminium oxide. Even the preparation of porous layers requires high temperatures since sub-$\mu$m zirconium oxide starts to solidify only from 1000° C. on, or sub-$\mu$m aluminium oxide only from 900° C. on. These temperatures are generally too high for the substrate materials to be improved, such as metals, glasses or enamel since glasses and enamel melt and metals lose their mechanical properties.

Compacting of a ceramic layer on a predetermined substrate must be carried out at considerably lower temperatures as is currently practiced in prior art. This means necessarily a reduction of the particle size used of the initial ceramic powder since diffusion of the particles is enhanced during sintering by the larger available surface, what in turn reduces the sintering temperature of the used ceramic particles. To form ceramic layers on metallic, ceramic, enameled or glass substrates, the primary particle size of the ceramic powders used must be below 200 nm, preferably below 100 nm and particularly preferred below 50 nm. The portion of ceramic particles compared to the organic binder portion in the layer must be high to provide sufficient contact between the particles which is the basic prerequisite for the sintering process. This means that the solid content of an unfired ceramic layer of nanoparticles on a predetermined substrate must be >30 percent by volume, preferably >35 percent by volume and, particularly preferred >40 percent by volume.

This requirement goes far beyond prior art. The processing of nanoparticles represents the main difficulty. For particles of a particle size of approximately 10 nm, the specific powder surface increases up to 250 m$^2$/g. In connection therewith, the portion of organic binders must be drastically increased since the existing large surface binds organic processing aids which are then no longer available to set the rheology. This in turn leads to very small solid contents in the e.g. sprayed ceramic layers, whereby the linear shrinkage and the tensions in the layer become that large during sintering that the layer cracks and becomes detached. Additionally, commercially available nanoparticles are often agglomerated (basic prerequisite for realizing flawless layers of nanoparticles is that the nanoparticles are isolated from each other) or are available only as precursors of ceramic particles. One example of these commercially available precursors is nanoscale AlO(OH) (Böhmit) which compacts during sintering at giving off water, which also causes detachment of the layer.

Literature gives only a few indications about the processing of nanoparticles into ceramic layers since there is always the difficulty of realizing sufficiently high solid contents for sintering. Most widely spread are the efforts to process nanoparticles into layers by screen printing. Carotta et al. [Adv. Mater. 1999, 11 No. 11] produce compositions of nanoscale titanium dioxide with maximum filler contents of 5.4 percent by volume. The best result known from literature for a ceramic composition of nanoscale particles which was processed by screen printing was a solid content of 17 percent by volume (55 percent per weight). None of these compositions permits production of ceramic layers on metallic, ceramic, enameled or glass substrates.

It is the underlying purpose of the present invention to provide a ceramic composition on the basis of nanoscale particles and a method for its production wherein the solid content of the nanoparticles, i.e. the powder content in the composition, is that high that ceramic layers can be produced on metallic, ceramic, enameled or glass substrates by means of known wet-chemical shaping methods such as spin coating, dip coating, immersion, spraying, screen printing or foil casting with subsequent lamination, wherein the ceramic layers can be compacted in a porous fashion, and wherein the porous ceramic layers should have a high inner surface such that they can be functionalised by adding a second component.

This object is achieved with a ceramic composition as characterized by the method steps of claim 1.

In this fashion, powder contents in the composition can be realized which are high enough to permit compacting of the applied ceramic layers already at low temperatures (depending on the application between 400 and 1200° C.) on the respective substrate (preferably metal, enamel, glass, ceramic) into a porous layer. By use of the surface-active oxycarboxylic acid highly homogeneous compositions can be achieved wherein the nanoparticles are dispersed to primary particle size to prevent the problems known from literature such as e.g. demixing.

The ceramic powder used is a nanoscale, ceramic-forming powder. It is in particular nanoscale chalcogenide, carbide or nitride powder. The chalcogenide powders may be oxide, sulfide, selenide or telluride powder. Nano-scale oxide powders are preferred. Any powder usually used for powder sintering may be used. Examples are (optionally hydrated) oxides such as $ZnO$, $CeO_2$, $SnO_2$, $Al_2O_3$, $CdO$, $SiO_2$, $TiO_2$, $In_2O_3$, $ZrO_2$, Yttrium-stabilised $ZrO_2$, $Al_2O_3$, $La_2O_3$, $Fe_2O_3$, $F_3O_4$, $Cu_2O$, $Ta_2O_5$, $Nb_2O_5$, $V_2O_5$, $MoO_3$ or $WO_3$ and also phosphates, silicates, zirconates, aluminates and stannates, sulfides such as $CdS$, $ZnS$, $PbS$ and $Ag_2S$, selenides such as $GaSe$, $CdSe$ and $ZnSe$, tellunides such as $ZnTe$ or $CdTe$, carbides such as $VC$, $CdC_2$ or $SiC$, nitrides such as $BN$, $AlN$, $Si_3N_4$ and $Ti_3N_4$, corresponding mixed oxides such as metal tin oxides, e.g. indium tin oxide (ITO), antimony tin oxide, fluor doped tin oxide and Zn doped $Al_2O_3$, luminescent pigments with Y- or Eu-containing compounds or mixed oxides with Perowskit structure such as $BaTiO_3$ and lead zirconium titanate (PZT). Mixtures of the powder particles stated may also be used.

The inventive composition preferably contains nanoscale particles which are preferably oxide, oxide hydrate, chalcogenide, nitride or carbide of Si, Al, B, Zn, Zr, Cd, Ti, Ce, Sn, In, La, Fe, Cu, Ta, Nb, V, Mo or W, particularly preferred of Si, Zr, Al, B, W and Ti. Oxides are most preferably used. Preferred nanoscale anorganic solid particles are aluminium oxide, AlO(OH) (Böhmit), zirconium oxide, yttrium stabilized zirconium oxide, iron oxide and titanium dioxide.

The anorganic particles contained in the composition generally have an average primary particle size in the region of between 1 and 100 nm, preferably 5 to 50 nm, and particularly preferred 5 to 20 nm. The primary particles may be present in an agglomerated form, preferably they are not agglomerated or substantially not agglomerated.

To form the layer, the initial powder is mixed with an organic binder which provides the required plastification of the mixture. The inventive ceramic composition contains at least one polymeric binder, at least one oxycarboxylic acid and at least one solvent.

Any thermoplastic polymer may be used as polymeric binder. Examples for thermoplastic polymers, which can be used are polyolefins such as polyethylene, dialcylphthalates (dimethyl phthalate, diethyl phthalate, dipropyl phthalate and dibutyl phthalate), polypropylene and poly-1-butene, polymethyl-(meth)acrylate, polyacrylonitril, polystyrene, and polyvinyl alcohol, polyamides, polyester, polyacetates, polycarbonates, linear polyurethanes and corresponding copolymers such as ethylene vinylacetate (EVA) copolymers, and biopolymers such as cellulosis, ambergum etc., wherein polyvinyl alcohols (PVA), polyvinyl pyrolidone (PVP), polyacrylates, polymethacrylates are preferred. A thermoplastic polymer or a mixture of two or more thermoplastic polymers can be used.

In a particular embodiment of the method, acrylates and methacrylates are used as polymer component which are cross-linked using a radical starter by means of e.g. UV radiation or thermally after shaping, thereby establishing the polymer component required within the inventive composition. All acrylate and methacrylate compounds available on the market are suitable. Preferred are the Lucirin trademarks and Laromer trademarks distributed by BASF such as LR8765, ES81, LR8713, LR8986, PE55F, PE56F, LR8793, LR8846, LR9004, LR8799, LR8800, LR8907, LR8981, LR8992, PE55W, LR8895, LR8949, LR8983, LR8739, LR8987, LR8748, LR8863, LR8945, LR8967, LR8982, LR8812, LR8894, LR8997, LR8864, LR8889, LR8869, LR8996, LR8946, LR8899, LR8985.

As radical starters all radical starters known to the person skilled in the art, may be used. This method is suited in particular when screen printing is used as ceramic shaping method and a precise structure is to be produced through mask engineering.

To produce the required compatibility between the ceramic particles and the polymer matrix, surface active molecules are used. These molecules must have a bi-functional structure to permit binding of one part of the molecule to the particle surface, and another part of the molecule realizes the compatibility with the matrix. Suitable therefore are especially bi-functional molecules from the class of the carboxylic acids, carboxamides, carboxylates, carboxylic acid chlorides, β-diketones, alkylsilanes and, in particular, oxycarboxylic acids. The oxycarboxylic acid used in the inventive embodiment of the method is trioxadecane acid and dioctaheptane acid.

As further component, the ceramic composition contains an organic solvent or a mixture of two or more organic solvents, preferably of the group of alkylene glycols, in particular, ethylene glycol, propylene glycol, diethylene glycol monobutyl ether, diethlyene glycol monoallyl ether, diethylene glycol monohexyl ether, diethylene glycol monodecyl ether, diethylene gycol monoethyl ether and molecules of similar structure. In one preferred embodiment, an alcohol mixture of ethylene glycol and diethylene gylcol monobutyl ether is used. In a particularly preferred embodiment, water is used as solvent.

The nanoscale powders are mixed with the polymers, the oxycarboxylic acid and the solvent or solvent mixture and applied onto the desired substrate through spin coating, dip coating, immersion, flooding, or spraying. They are dried, then the binder is removed, and subsequently they are compacted into a flawless porous ceramic layer. The layer produced in this fashion can be soaked with a substance i.e. be filled with a substance which gives the porous layer a new functionality.

In a special embodiment of the invention, the layers are sintered close to their theoretical density.

The inventive ceramic composition permits production of ceramic layers on metal, glass, enamel or ceramic having layer thicknesses of between 100 nm and 10 μm. The layers are transparent and completely flexible. The layers can be bent and bent back up to an angle of 160° on a 0.5 nm steel sheet metal without cracking or chipping off the layer. This flexibility exceeds by far the flexibility of ceramic layers of prior art. The inventive ceramic layers can be produced to be porous. Both a dense and a porous ceramic layer ensure improved chemical resistance of the layered substrate, improved scratch resistance and increased temperature stability. The porous ceramic layer moreover has a very large inner surface which can be filled with a second component in order to functionalize the porous ceramic layer. The porous ceramic layers can be filled with hydrophobizing, hydrophilizing dirt-repellent and corrosion-inhibiting substances which remain in the substrate or are supplied when required, or are loaded with bactericidal substances, aromatics, perfumes or inhalation substances which are delivered to the room air in precise doses.

In a particular embodiment of the invention, the porous ceramic layer has a fractal surface roughness which causes non-wetting of water drops and oil drops. The process parameters are chosen such that the porosity has a fractal structure. The resulting surface structure is hydrophobic such that the ceramic layer has self-cleaning properties.

In a fractal structure, the open pores are uniformly distributed on the surface, or open pores of different sizes are uniformly distributed over the surface.

If the inventive ceramic layers are transparent, they are suited for optical products.

If the porous layer is filled with one substance, this substance may migrate to the surface of the ceramic layer and eliminate disturbances of the set layer function (e.g. dirt-repellent) by means of a type of depot function.

The invention concerns a method for producing porous ceramic layers on metallic, ceramic, enameled or glass substrates using crystalline nanoparticles of particle sizes of between 3 nm and 100 nm via a wet-chemical process and functionalising of this porous ceramic layer by introducing a second component into the pores of the porous ceramic layer which serves as carrier layer.

The porous ceramic layers can be filled with hydrophobizing, hydrophilizing, dirt-repellent and corrosion-inhibiting substances which remain in the substrate or are supplied later when required, or are filled with bactericidal substances, aromatics, perfumes or inhalation substances which are delivered to the room air in precise doses.

The following examples explain the invention without limiting it.

EXAMPLE 1

30 g of nanoscale yttrium-stabilized zirconium dioxide (primary particle size 10 nm) are mixed with an oxycarboxylic acid diluted in water. 4.5 g polyvinyl alcohol is added to this suspension and the suspension is homogenized. The transparent to translucent solution is disposed through immersion coating onto a 10×10 cm steel substrate (1.4511 or 1.4301) and dried in a drying cabinet at 80° C. The coated steel substrate 1 is subsequently kept at 500° C. for one hour. The heating rate was 5K/min. A porous ceramic layer was formed.

EXAMPLE 2

Analog to example 1, a steel substrate is provided with a porous ceramic layer. The layer is subsequently impregnated with a commercially available fluorsilane which was pre-hydrolized, and is solidified at 150° C. A scratch-resistant layer is produced which is water- and oil-repellent.

EXAMPLE 3

30 g nanoscale yttrium-stabilized zirconium dioxide (primary particle size 10 nm) is submixed with an oxycarboxylic acid diluted in ethylene glycol. An acrylate binder (Laromer BASF) and a radical starter are added to this suspension and the suspension is homogenized by stirring. The transparent to translucent solution is applied to a 10×10 cm steel substrate (1.4511 or 1.4301) and hardened by UV light. The layer is compacted for one hour at 500° C.

The invention concerns a method for producing porous ceramic layers on metallic, ceramic, enameled or glass substrates using crystalline nanoparticles with particle sizes of between 3 nm and 100 nm via a wet-chemical process and functionalising of this porous ceramic layer through introducing a second component into the pores of the porous ceramic layer which serves as carrier layer.

The porous ceramic layers can be filled with hydrophobizing, hydrophilizing, dirt-repellent and corrosion-inhibiting substances which remain in the substrate or are provided later upon demand or are loaded with bactericidal substances, aromatics, perfumes or inhalation substances which are delivered to the room air in precise doses.

What is claimed is:

1. A method for producing porous ceramic layers on a metallic, a ceramic, an enameled or a glass substrate, said method comprising:
    mixing oxide, carbide, nitride or sulfide powder particles of a size between about 3 nm and about 100 nm with an oxycarboxylic acid and a combination of at least one solvent and at least one polymeric binder (or a combination of a monomer and a radical starter) to form a mixture having a solids content of nanoparticles of greater than about 30 percent by volume;
    applying the mixture onto the substrate by dip-coating, spin coating, immersion, flooding, spraying, screen printing or film casting; and
    drying and solidifying the applied mixture into a porous layer.

2. The method according to claim 1 further comprising a step of selecting process parameters in order to fill the porous layer with a substance.

3. The method according to claim 1 further comprising a step of selecting process parameters in order to establish a fractal structure of the porous layer.

4. The method according to claim 1 wherein the mixture has a solids context of nanoparticles of greater than about 35 percent by volume.

5. The method according to claim 1 wherein the mixture has a solids content of nanoparticles of greater than about 40 percent by volume.

6. The method according to claim 1 comprising sintering the mixture close to theoretical density.

7. The method according to claim 1 further comprising the step of adding a substance selected from a group consisting of hydrophobizing, hydrophilizing, dirt-repellent, corrosion inhibiting, bactericidal, aromatic, perfume, medicine and inhalation substances to the porous layer.

8. The method according to claim 1 further comprising the step 13 of using the porous ceramic layer as a corrosion protection layer.

9. The method according to claim 1 further comprising the step of using the porous ceramic layer as a tribiological layer.

10. The method according to claim 1 further comprising the step of using the porous ceramic layer as a self-cleaning or easy-to-clean layer.

11. The method according to claim 4 further comprising the step of using the porous ceramic layer as a carrier of medicine.

12. The method according to claim 4 further comprising the step of using the porous ceramic layer as a filter.

13. A porous ceramic layer comprising:
    an oxide, carbide, nitride or sulfide powder comprising particles of a size between about 3 nm and about 100 nm;

an oxycarboxylic acid;

at least one solvent; and at least one polymeric binder (or a combination of a monomer and a radical starter), said porous ceramic layer having a solid content of nanoparticles greater than about 30 percent per volume.

14. The porous ceramic layer according to claim 13 wherein the porous ceramic layer withstands bends of up to about 120° without damage.

15. The porous ceramic layer according to claim 13 wherein the porous ceramic layer is transparent.

16. The porous ceramic layer according to claim 13 further comprising at least one substance of a group consisting of hydrophobizing, hydrophilizing, dust-repellent, corrosion-inhibiting, bactericidal, aromatic, perfume, medicine and inhalation substance disposed in pores of said porous ceramic layer.

17. The porous ceramic layer according to claim 16 wherein said porous ceramic layer comprises pores enabling migration of the substance to a surface of said porous ceramic layer.

* * * * *